Aug. 27, 1929.     J. B. ARMITAGE     1,726,330
LUBRICATING MEANS FOR MOTOR DRIVEN MACHINE TOOLS
Filed Feb. 15, 1926
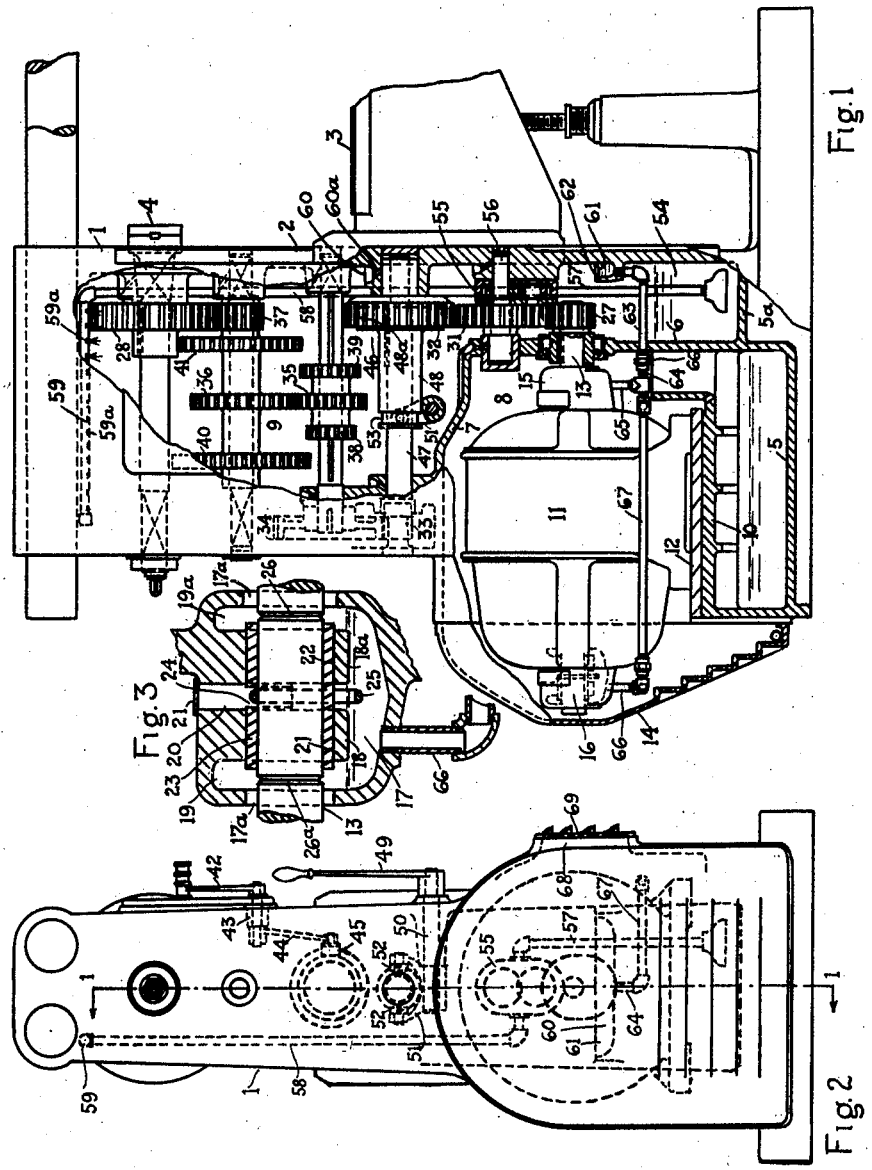
INVENTOR
Joseph B Armitage
BY
Fred G Parsons
ATTORNEY Patented Aug. 27, 1929.

1,726,330

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

LUBRICATING MEANS FOR MOTOR-DRIVEN-MACHINE TOOLS.

Application filed February 15, 1926. Serial No. 88,376.

This invention relates to lubricating means for motor driven machine tools.

The main object of this invention is to provide for and insure thorough lubrication for the bearings of an electric motor when the motor is used to drive a machine tool, without care or attention on the part of the operator, and more particularly when the machine tool is provided with means for the continuous and certain lubrication of some of its driving trains or bearings.

The invention consists in certain novel features of construction, and in the peculiar arrangement and combination of parts, as hereinafter described and claimed.

To illustrate my invention I have shown it embodied in a machine tool of the type generally known as a knee and column milling machine. In the drawings, Fig. 1 shows a left elevation of such a machine partly in section along line 1—1 of Fig. 2, certain well known portions of the machine being omitted. Fig. 2 is a rear elevation of the same machine and Fig. 3 is a fragmentary section, enlarged, through one of the bearings of the motor. The same reference characters are used for the same parts in each view.

1 is a hollow frame or column upon the front face 2 of which a knee 3 is vertically slidable. Knee 3 ordinarily supports a saddle and table, not here shown, which together with the knee provide for work movement relative to the column in three transverse paths or directions relative to a tool spindle 4 rotatably supported from column 1. The hollow column is provided with bottom walls 5 and 5ª, and with a vertical wall 6 and a horizontal wall 7, forming, together with the various upstanding exterior walls a plurality of main chambers including a motor chamber 8 and a gear chamber 9. A horizontal wall 10 within the motor chamber provides support for a motor 11 which is mounted upon a plate or shim member 12, plates 12 of various thickness being used for different motors so that the shaft 13 of the motor may stand at the same height relative to spindle 4 irrespective of variations in the motor height. The motor chamber 8 is open at the rear to permit the motor to be entered therein and later closed by the means of a cover 14 pivoted or removably bolted with the column.

The motor is provided with front and rear bearings 15 and 16 for motor shaft 13. These being similar in construction the rear bearing only will be described in detail, as particularly llustrated in Fig. 3. The motor frame or housing is hollowed out to form a chamber generally denoted by the numeral 17 and having end openings or bores 17ª through which shaft 13 may pass. Within the chamber and fixed to the top wall thereof are a plurality of bosses 18 and 18ª, spaced to provide end portions 19 and 19ª for chamber 17, and an intermediate slot 20 which is upwardly open but provided with a removable cover 21.

The bosses 18, 18ª are provided with aligned bores 21, 22 suited to receive a bushing 23 within which shaft 13 has its bearing. Bushing 23 is provided with a slot 24 positioned to open into the slot 20 and exposing shaft 13, sufficient of the bushing being cut away in forming slot 24 that an annular ring 25, positioned in the slot 20 so that shaft 13 passes through it, will drop down and be supported on its inner circumference by shaft 13. The chamber 17 is continuously supplied with lubricant by means to be described later, to a height sufficient for the lower portion of ring 25 to dip therein but not sufficient to overflow the lowest portion of the openings 17ª. When shaft 13 revolves in either direction, the ring 25 resting thereon will turn, and lubricant clinging to the ring will be elevated as the ring turns and be spread over the portion of shaft 13 with which the ring contacts, from whence it will spread along the shaft in either direction and through the bushing 23 to lubricate the shaft bearing therein. Surplus lubricant after passage through bushing 23, is prevented from moving farther along shaft 13 by the means of grooves 26 and 26ª, whereupon it drops back into the chamber 17 to be used again.

The construction described constitutes an oiling device individual to the bearing and adapted to elevate lubricant from the individual chambers 17.

The chambers 17 for both the bearings 15 and 16 are continuously supplied with lubricant from a reservoir at a lower level of the column structure and elevated to the height required in the chambers by the means of a pump driven from the motor whenever the motor is operated, means being provided to insure that the level of the lubricant within the chambers 17 shall not vary outside the limits previously mentioned.

To accomplish this with greatest simplicity of mechanism it is preferable to utilize in a large measure, lubricating means provided for the gearing and shafts associated with the gear chamber 9 which will now be described, although in the absence of means for continuously lubricating the gear shafts and bearings means similar to that described below may be used for the purpose of lubricating the motor bearings alone, or similar means may be applied individually to the motor bearings and to the gears and bearings within the gear chamber 9.

The spindle drive train within the gear chamber consists of a pinion 27 fixed on an end of the motor shaft which projects through the wall 6, a gear 28 fixed on the spindle, and the intermediate gears 31, 32, 33, 34, 35, 36, 37 rotatably supported on suitable shafts and bearings. The gear 35 is slidable on its supporting shaft, and movable therewith are the gears 38, 39, respectively engageable with the gears 40, 41, fixed to revolve with gear 36. The gears 38, 35, 39, are slidable by the means of an exterior hand lever 42 fixed on a shaft 43, having an inner lever 44 provided with a pivoted fork 45 engaging with the sides of the gear 35. The gear pairs 38—40, 35—36, 39—41, are of different ratio and being alternatively available constitute a speed change device effective on the spindle 4.

Associated with the gear 32 is a clutch generally denoted by the numeral 46. The gear is rotatable independently of the shaft 47 on which it is supported. A sleeve 48 is slidably keyed to the shaft and provided with an enlarged cone shaped friction portion 48$^a$ adapted to engage a complementary friction surface of the gear 32. Sleeve 48 may be shifted by the means of an exterior hand lever 49 fixed on a shaft 50 on the inner end of which a fork 51 is fixed and provided with pivoted shoes 52 engaging a spool or annular groove 53 in the sleeve. Thus the sleeve may be moved in the one or the other direction to engage or disengage the friction surfaces whereby the spindle drive train may be established or interrupted.

The lower portion of the chamber 9 provides a reservoir 54 at a structure level substantially underneath the motor bearings 15 and 16, and also underneath the various gears and bearings of the spindle drive train. A pump 55 of a well known type embodying enclosed rotary gears is fixed on the front wall of the column and the shaft 56 of gear 31 provides a drive shaft for operating the pump whenever the motor 11 is operated. A suction pipe or lubricant channel 57 extends downwardly from the suction port of the pump to extend below the lubricant level in the reservoir 54, and a delivery pipe or lubricant channel 58 extends upwardly from the delivery or pressure port of the pump to a header 59 at an upper level of the chamber 9. Header 59 is provided with perforations 59$^a$ from which lubricant is sprayed to fall over the gears and bearings and the interior walls of chamber 9, the rotation of the gearing assisting materially in filling the interior of chamber 9 with flying drops of lubricant. Thus the gear surfaces are efficiently lubricated and to lubricate the bearings pockets are provided as typified by the pocket 60 for the front bearing of the shaft 47. These pockets are upwardly open and are adapted to receive the flying drops of lubricant directly, and to receive lubricant flowing down the interior wall faces of the chamber. Lubricant thus collecting in the pockets is fed into the associated bearing by the means or channels such as channel 60$^a$ from which it passes through the bearing and returns by gravity to the reservoir 54, together with the other surplus lubricant distributed from the header 59. The shafts of the gear train are arranged one above another so that the lower pockets receive lubricant which has overflowed from or passed through the upper bearings.

Underneath the various pockets for the bearings associated with the interior of the front wall 2 is a pocket 61 provided with an overflow lip 62 at a level substantially the same as the level previously described for the lubricant within the motor bearing chambers 17. The pocket 17 is adapted to receive lubricant directly from the header or from the various bearings above it or from any surplus lubricant flowing down the interior front wall surface, and will thus be maintained full of lubricant at all times, surplus lubricant spilling over the lip 62 and returning to reservoir 54 to be used again.

From the pocket 61 a pipe or lubricant channel 63 extends to the rear of the wall 6 and is there joined to a pipe or lubricant channel 64 by the means of a disconnectible coupling 66 which may be any of several well known forms. The channel 64 communicates with risers 65 and 66 respectively associated with motor bearings 15 and 16 by the means of suitable piping and fittings forming distributing channels associated with motor 11, and generally denoted by the numeral 67. An opening 68 in the side wall of the column provides access to the coupling 66 for disconnection or connection thereof when removing or replacing motor 11. Opening 68 is normally closed by a removable cover plate 69.

The piping 67 and risers 65, 66, constitute a passageway connecting the chambers 17 of the individual oiling devices of each of the motor bearings 15 and 16, such passageway being unitary with the motor 11 and removable therewith.

The oil channels above described extending from the pocket 61 to the motor bearings, serve to establish the lubricant at the same level within the chambers 17 of the motor bearing and in the pocket 61, such level being determined by the overflow lip 62, and maintained by the means of the pump 53 which continuously supplies the pocket from lubricant within the reservoir 54 located at a structure level materially below the motor bearings.

The suction pipe 57, delivery pipe 58, header 59, the interior of chamber 9, the pocket 61, pipe 63, coupling 66 and pipe 64 together constitute a channel communicating from the reservoir 54 to the previously mentioned passageway between bearings 15 and 16, and together with the passageway form a channel from the reservoir and pump to each of the individual oiling devices associated with the respective motor bearings.

Various modified but equivalent constructions may be made in the light of the above disclosure, each of which are within the spirit and scope of this invention as defined in the following claims.

I claim:

1. In a lubricating means for machine tools including a motor having a bearing and spindle drive gearing connected to be driven from said motor and at a level substantially above said bearing, said gearing being housed within a chamber separated from said motor and bearing; the combination of a reservoir, a pump adapted to elevate lubricant from said reservoir to an opening within said chamber and at a level higher than said bearing, an overflow cup within said chamber and adapted to receive fluid from said opening, and a lubricant channel adapted to receive lubricant from said cup within said chamber and supply such lubricant to said bearing outside said chamber.

2. In a lubricating means for machine tools including a motor having a bearing and spindle drive gearing connected to be driven from said motor and at a level substantially above said bearing, said gearing being housed within a first chamber and said motor and bearing being housed within a second chamber; the combination of a reservoir, a pump adapted to elevate lubricant from said reservoir through a channel having an opening within said first chamber and at a level above said bearing, an overflow device within said first chamber and adapted to receive lubricant from said opening, a pocket underneath said bearing in said second chamber, means adapted to elevate lubricant from said pocket to said bearing, and a channel communicating from the one to the other of said chambers and connected to supply lubricant from said overflow device to said pocket.

3. In a machine tool including a motor and a spindle drive train connected to be driven therefrom; the combination of a column structure supporting said train and providing a chamber within which said motor is housed, and lubricating means for a bearing of said motor including a pump, an overflow device outside said chamber and supplied with lubricant from said pump, and a channel for supplying lubricant from said device to said bearing within said chamber.

4. In a machine tool including a motor and a spindle drive train connected to be driven therefrom; the combination of a structure including a wall separating the bearings of said motor and said train, means continuously supplying lubricant to the bearings both of said train and of said motor, and means adapted to deliver lubricant not required for immediate use in said motor bearings to the side of said wall on which said train bearings are situated.

5. In a machine tool including a motor and a spindle drive train at a higher level and connected to be driven therefrom, the combination of lubricating means common to said motor and to said train including a reservoir at a level underneath said motor, a pump adapted to supply lubricant from said reservoir to bearings of said train at a pressure sufficient to reach the higher level thereof, means adapted to supply lubricant from said pump at a pressure sufficient only to reach a point below the bearings of said motor, and means to elevate lubricant from such point to said motor bearings.

In witness whereof I hereto affix my signature.

JOSEPH B. ARMITAGE.